(12) United States Patent
Atcravi

(10) Patent No.: US 6,729,678 B1
(45) Date of Patent: May 4, 2004

(54) MULTI-STORY RECREATIONAL VEHICLE

(76) Inventor: Itty Atcravi, P.O. Box 721899, San Diego, CA (US) 92172-1899

( * ) Notice: Subject to any disclaimer, the term of this patent is extended or adjusted under 35 U.S.C. 154(b) by 0 days.

(21) Appl. No.: 10/177,594

(22) Filed: Jun. 19, 2002

Related U.S. Application Data

(60) Provisional application No. 60/299,683, filed on Jun. 20, 2001.

(51) Int. Cl.[7] ................................................. B60P 3/335
(52) U.S. Cl. ....................................... 296/168; 296/165
(58) Field of Search ............................... 296/168, 26.13, 296/171, 175, 165, 172, 156, 176, 26.01, 173; 52/67, 79.8, 234, 236.3, 185, 79.5

(56) References Cited

U.S. PATENT DOCUMENTS

| | | | | | |
|---|---|---|---|---|---|
| 1,945,089 A | * | 1/1934 | Small et al. | ................. | 296/168 |
| 2,589,894 A | * | 3/1952 | Ten Eyck | ................... | 296/168 |
| 2,803,855 A | * | 8/1957 | Suter | ........................... | 296/168 |
| 3,574,388 A | * | 4/1971 | Stone | .......................... | 296/168 |
| 3,811,707 A | * | 5/1974 | Jeambey | ................. | 280/423.1 |
| 3,817,545 A | * | 6/1974 | Ward | .............................. | 296/168 |
| 3,850,470 A | * | 11/1974 | Trelle | .......................... | 296/165 |
| 3,875,869 A | * | 4/1975 | Molnar | ........................ | 105/1.4 |
| 4,017,116 A | * | 4/1977 | Hulsey | ......................... | 296/156 |
| 4,025,102 A | * | 5/1977 | Hiles | ........................... | 296/167 |
| 4,103,958 A | * | 8/1978 | Parent | .......................... | 296/165 |
| 4,108,487 A | * | 8/1978 | Spohn | ......................... | 296/156 |
| 4,127,299 A | * | 11/1978 | Blair | ............................ | 296/168 |
| 4,261,614 A | * | 4/1981 | Rice | ............................. | 296/171 |
| 4,550,946 A | * | 11/1985 | Hanemaayer | ............... | 296/156 |
| 5,374,094 A | * | 12/1994 | Smith et al. | ................ | 296/165 |
| 5,487,240 A | * | 1/1996 | Miller | ........................... | 52/33 |
| 5,638,646 A | * | 6/1997 | Shane | ......................... | 52/79.1 |
| 5,791,677 A | * | 8/1998 | Froehlich | .................... | 280/507 |
| 5,967,583 A | * | 10/1999 | Wishart | ....................... | 296/156 |
| 6,299,229 B1 | * | 10/2001 | Becenas Nieto | ........... | 296/24.1 |
| 6,302,475 B1 | * | 10/2001 | Anderson | .................... | 296/175 |
| 6,394,533 B1 | * | 5/2002 | Ladell et al. | ............... | 296/165 |
| 6,447,048 B2 | * | 9/2002 | Crean | .......................... | 296/168 |
| 2002/0125736 A1 | * | 9/2002 | Messano | ..................... | 296/165 |
| 2003/0115808 A1 | * | 6/2003 | Morrow | ....................... | 296/165 |

* cited by examiner

Primary Examiner—Kiran Patel

(57) ABSTRACT

A multi-story recreational vehicle having a front section containing a living area (150), a rear section containing a first bedroom (117) and a second bedroom (151) positioned above the first bedroom, and a middle section containing a bathroom (118) and a third bedroom (152) positioned above the bathroom. The second bedroom's floor (168) staggers with the first bedroom's ceiling (172) whereas the third bedroom's floor (179) staggers with the bathroom's ceiling (183). The first bedroom has a retractable room extension in the form of a slide (128) positioned across the room from the second bedroom's floor.

20 Claims, 12 Drawing Sheets

U.S. 6,729,678 B1

MULTI-STORY RECREATIONAL VEHICLE

RELATED APPLICATION

The present application claims priority to U.S. Provisional Patent Application Ser. No. 60/299,683, filed Jun. 20, 2001.

FIELD OF THE INVENTION

The present invention relates to recreational vehicles such as trailers and motor homes, and specifically to multi-story self-contained fifth-wheel trailers, travel trailers and motor homes with a living area, a kitchen or galley, a bathroom and multiple bedrooms or sleeping compartments.

BACKGROUND OF THE INVENTION

One problem with conventional recreational vehicles is that they do not provide as many separated bedrooms or sleeping compartments as many people would like to have. Longer recreational vehicles with two bedrooms are available but they are usually difficult to drive, tow or park whereas double-deck recreational vehicles such as converted double-deck buses are usually too tall to travel on most highways.

Many recreational vehicles include a cabover bed or a loft bed which can be accessed by means of a ladder. However, these types of bed do not provide the users with the same degree of convenience and privacy as walk-in bedrooms.

Various types of split-level recreational vehicles with staggered floors have been disclosed but they are usually either too large on the outside or do not have a large and open living area on the inside due to the fact that the walking areas on the upper story are positioned below the ceiling of the lower story.

SUMMARY OF THE INVENTION

It is therefore an object of the present invention to provide a split-level recreational vehicle with multiple bedrooms or sleeping compartments which utilizes the available space more efficiently than previously thought possible.

Another object of the present invention is to provide a medium-size recreational vehicle with 3 walk-in bedrooms, with an island bed in one of the bedrooms, as well as a large and open living area and a bathroom. This is to be done in such a way that an occupant can walk from any bedroom to the living area or the bathroom without going through another bedroom.

A further object of the present invention is to provide a recreational vehicle which includes the above features as well as an office, a second bathroom and a fourth sleeping compartment.

These objects are achieved by positioning one bedroom on top of another in the rear section of the recreational vehicle and by providing the downstairs bedroom with a slide on one side. The middle section of the vehicle includes a bathroom, a passageway, and a third bedroom positioned on top of the bathroom whereas the front section includes a living area, preferably with one or two additional slides.

Since any of the bedrooms or sleeping compartments may be used as a storage compartment, this type of arrangement also provides an efficient use of space when some of the bedrooms are not used for sleeping.

The interior height of the recreational vehicle of the present invention is approximately one and a half times that of a conventional one-story recreational vehicle. However, since the recreational vehicle of the present invention may be built without a basement and the air conditioner may be positioned under the roof, its overall exterior height may be comparable to that of a conventional one-story recreational vehicle with a large basement and a roof-mounted air conditioner.

REFERENCE NUMERALS IN DRAWINGS

Reference Numerals for The Preferred Embodiment

Figure 1:
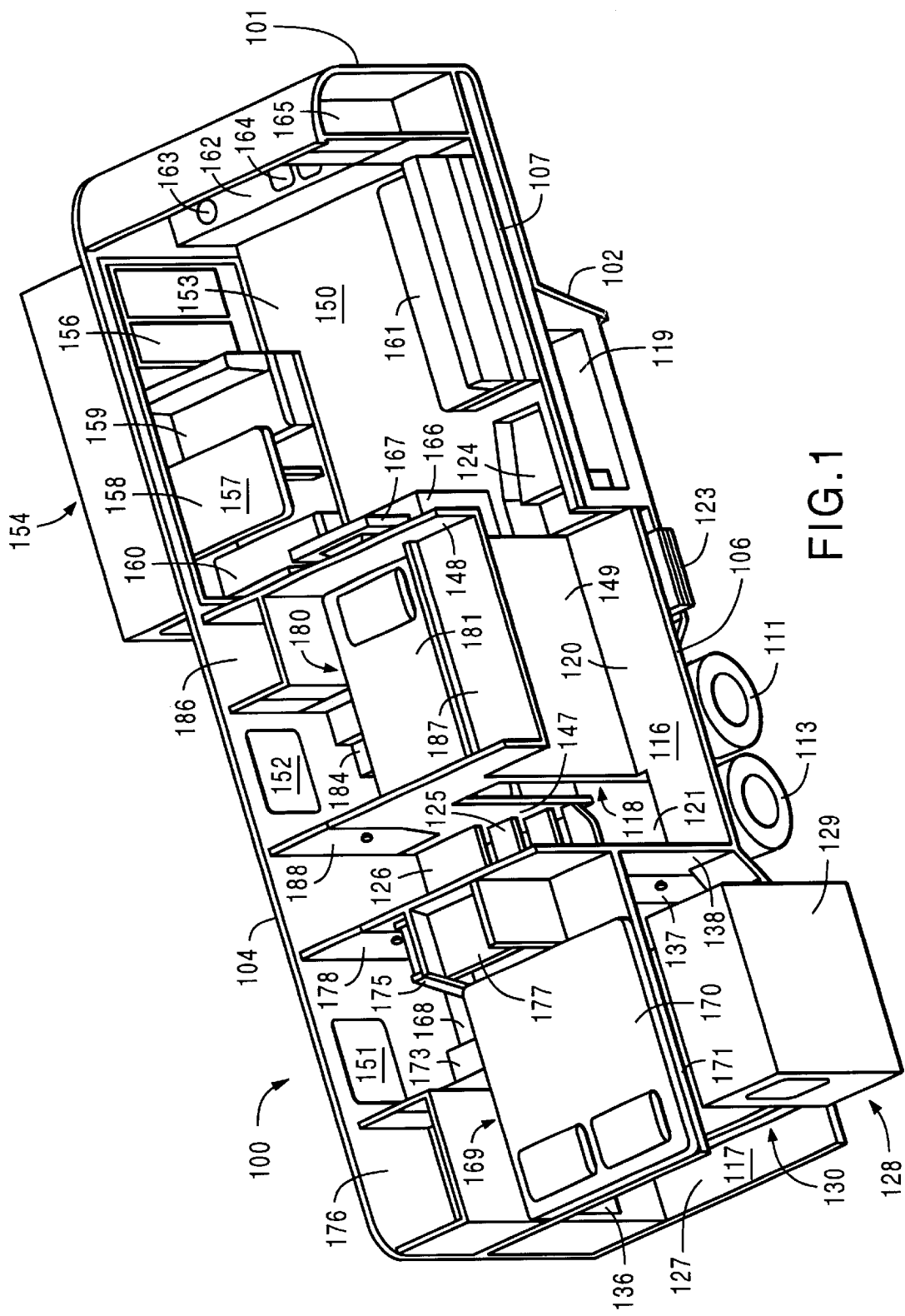
FIG. 1 is a perspective view of the preferred embodiment which is a fifth-wheel trailer of approximately 9.1 m (30 feet) in length with the right side wall, the rear end wall and the roof omitted to show the interior of the vehicle.
Figure 2:
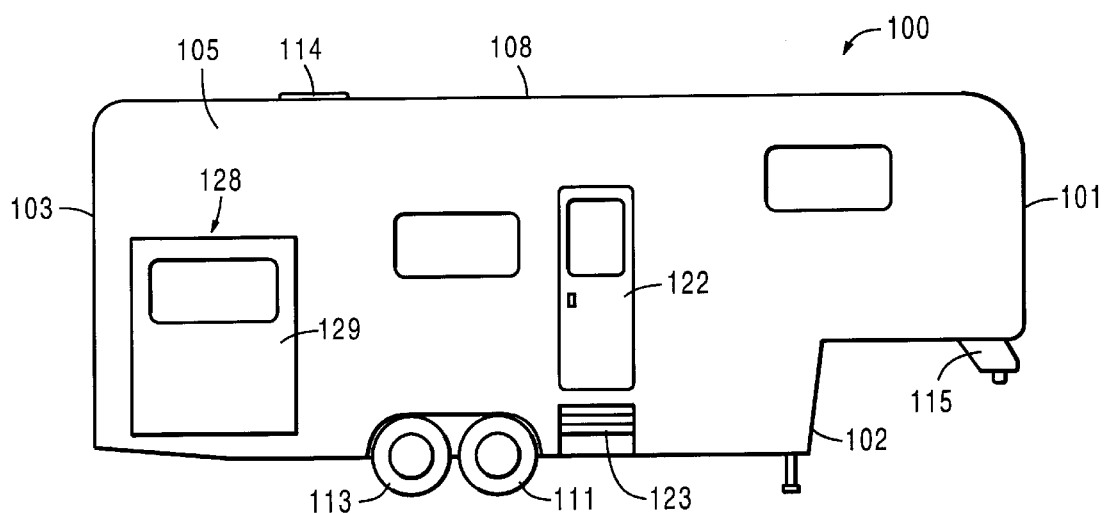
FIG. 2 is an external side view of the preferred embodiment.
Figure 3:
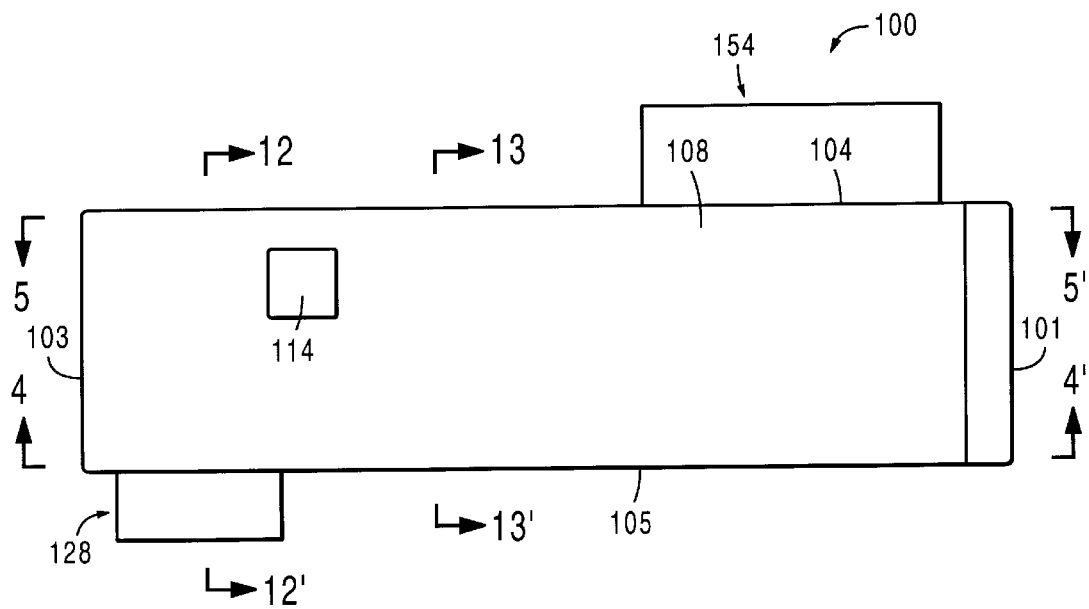
FIG. 3 is an overhead view of the preferred embodiment with the slides extended.
Figure 4:
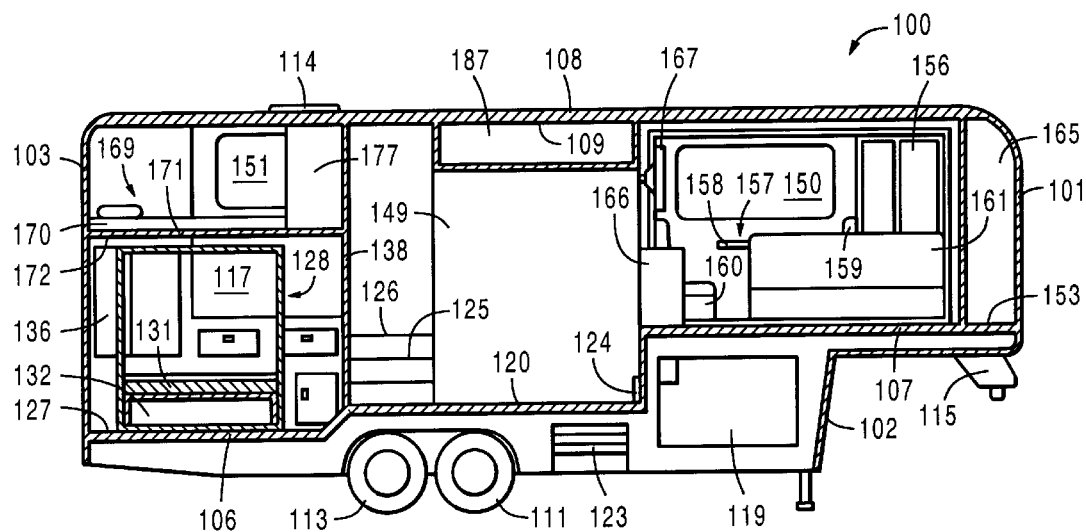
FIG. 4 is a sectional side view of the preferred embodiment taken along line 4-4' in FIG. 3.
Figure 5:
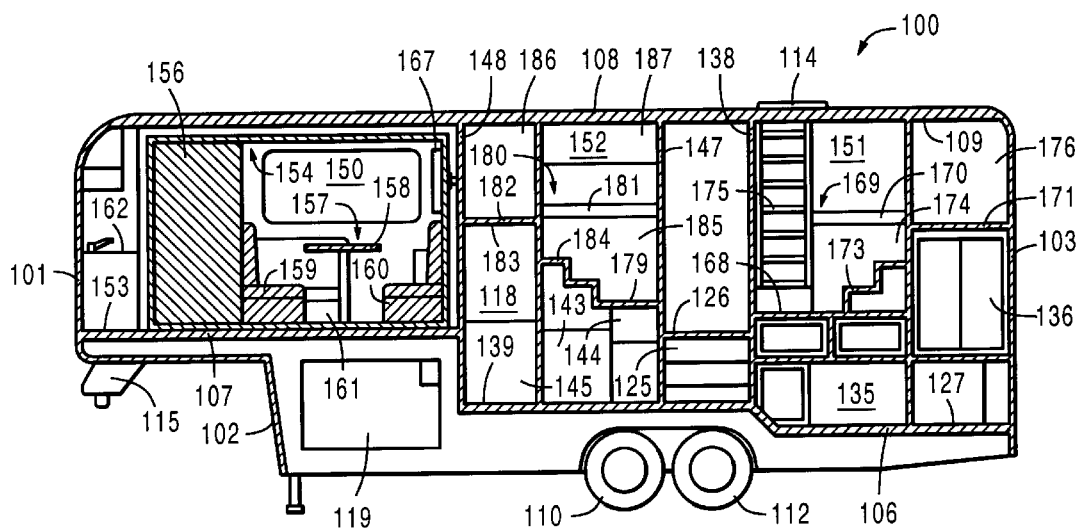
FIG. 5 is a sectional side view of the preferred embodiment taken along line 5-5' in FIG. 3.

100 fifth-wheel trailer
101 upper front end wall 102 lower front end wall
103 rear end wall
104 left side wall
105 right side wall
106 main deck
107 upper deck
108 roof
109 lower surface of roof 108
110 wheel
111 wheel
112 wheel
113 wheel
114 hatch
115 hitch assembly
116 passageway
117 first bedroom
118 bathroom
119 storage compartment
120 upper floor of passageway 116
121 lower floor of passageway 116
122 entry door
123 retractable steps
124 staircase
125 staircase
126 landing
127 first bedroom floor
128 slide
129 exterior wall of slide 128
130 queen-size bed
131 mattress
132 storage compartment
133 head end of bed 130
134 foot end of bed 130
135 closet
136 wardrobe
137 door
138 interior wall
139 bathroom floor
140 bath tub
141 sink
142 toilet
143 combination washer and dryer
144 storage compartment
145 storage compartment
146 door
147 interior wall
148 interior wall
149 interior wall
150 living area
151 second bedroom
152 third bedroom
153 floor of living area 150
154 slide
155 exterior wall of slide 154
156 refrigerator
157 dinette
158 dining table
159 bench
160 bench
161 sofa
162 kitchen counter
163 stove
164 double sink
165 storage compartment
166 entertainment center
167 television
168 second bedroom floor
169 queen-size bed
170 mattress
171 platform
172 lower surface of platform 171
173 steps
174 inclined partition
175 ladder
176 storage compartment
177 storage compartment
178 door
179 third bedroom floor
180 twin bed
181 mattress
182 platform
183 lower surface of platform 182
184 steps
185 inclined partition
186 storage compartment
187 storage compartment
188 door Reference Numerals for The Second Embodiment 200 fifth-wheel trailer
201 passageway
202 first bedroom
203 first bathroom
204 second bathroom
205 office
206 storage compartment
207 upper floor of passageway 201
208 lower floor of passageway 201
209 entry door
210 staircase
211 staircase
212 landing
213 slide
214 bed
215 closet
216 sink
217 shower stall
218 toilet
219 sliding door
220 floor of office 205
221 desk
222 chair
223 living area
224 second bedroom
225 third bedroom
226 fourth sleeping compartment
227 slide
228 loft bed
229 mattress
230 platform
231 ladder
232 storage compartment Reference Numerals for The Third Embodiment 300 travel trailer
301 passageway
302 first bedroom
303 bathroom
304 living area
305 upper floor of passageway 301
306 lower floor of passageway 301
307 entry door
308 staircase
309 landing 310 slide
311 slide
312 second bedroom
313 third bedroom Reference Numerals for The Fourth Embodiment 400 motor home
401 driver's seat
402 passenger's seat
403 living area
404 passageway
405 first bedroom
406 bathroom
407 entry door
408 staircase
409 landing
410 slide
411 slide
412 dinette
413 storage compartment
414 television
415 sofa
416 refrigerator
417 kitchen counter
418 double sink
419 stove
420 drop leaf
421 slide
422 second bedroom
423 third bedroom

DESCRIPTION OF THE PREFERRED EMBODIMENT

FIGS. 1–13 show the preferred embodiment of the present invention which is a 3-bedroom fifth-wheel trailer 100. This embodiment is approximately 9.1 m (30 feet) long, 2.6 m (8.5 feet) wide and 3.9 m (12.9 feet) tall.

The term "fifth-wheel trailer" is used herein to include any type of trailer with an overhanging front section which is designed to be positioned over the rear section of a tow vehicle, such as the bed of a pick-up truck.

The term "bedroom" is used herein to mean a substantially enclosed sleeping compartment which includes a standing area.

The body and chassis of fifth-wheel trailer 100 include an upper front end wall 101, a lower front end wall 102, a rear end wall 103, a left side wall 104, a right side wall 105, a main deck 106, an upper deck 107, a roof 108 with a lower surface 109, and four wheels 110, 111, 112 and 113. A hatch 114 is provided on roof 108 and may be used as an emergency exit. Fifth-wheel trailer 100 may be connected to a tow vehicle by means of a hitch assembly 115.

The lower story of fifth-wheel trailer 100 includes a passageway 116, a first bedroom 117, a bathroom 118 and a storage compartment 119 which are positioned on main deck 106. Passageway 116 includes an upper floor 120 and a lower floor 121. Upper floor 120 is positioned above right wheels 111 and 113 at approximately 1 m above the ground whereas lower floor 121 is positioned at approximately 0.8 m above the ground.

An entry door 122 and retractable steps 123 are provided on the right side of the vehicle. Two staircases 124 and 125 are provided at the front and rear ends of passageway 116 in the respective order. Staircase 125 leads to a landing 126 which is positioned at approximately 0.9 m above lower floor 121 of passageway 116. Alternatively, any other type of access member such as a ladder or an elevator may be used in place of staircase 125 and landing 126.

First bedroom 117 has a floor 127 which is positioned at the same level as lower floor 121 of passageway 116 at approximately 0.8 m above the ground. First bedroom 117 is equipped with a slide 128 on the right side of the vehicle. Slide 128 includes an exterior wall 129 and resembles an open box positioned on one side with its open end facing the left side of the vehicle. Slide 128 is shown in its extended position in FIGS. 1, 3, 6 and 12 and shown in its retracted position in FIG. 8. Exterior wall 129 is flush with right side wall 105 when slide 128 is in its retracted position. Slide 128 may be extended outwards by approximately 0.6 m by means of a hand crank or an electric motor in the usual manner. Alternatively, any other type of retractable room extension such as a fold-out room extension may be used.

Figure 6:
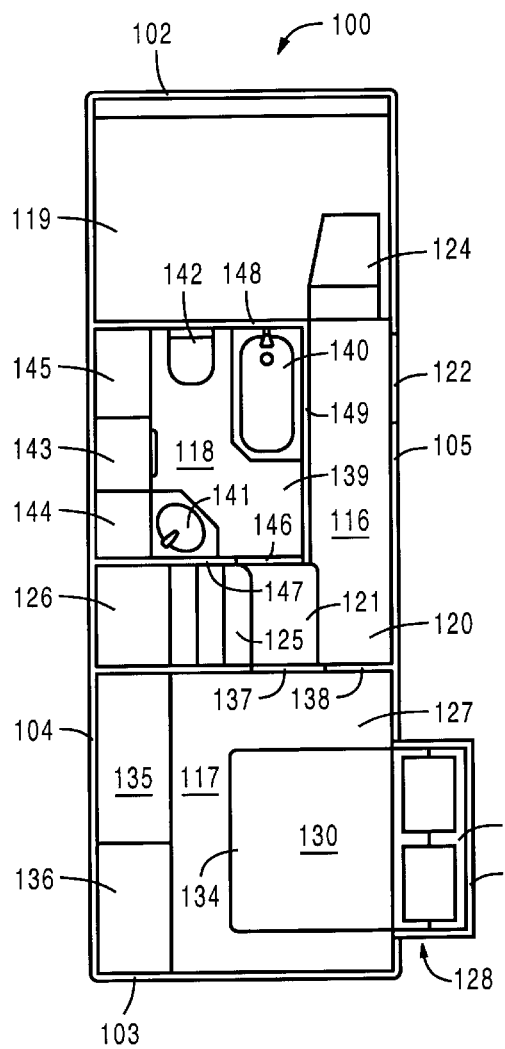
FIG. 6 shows a floor plan of the lower story of the preferred embodiment with the right slide extended.
Figure 7:
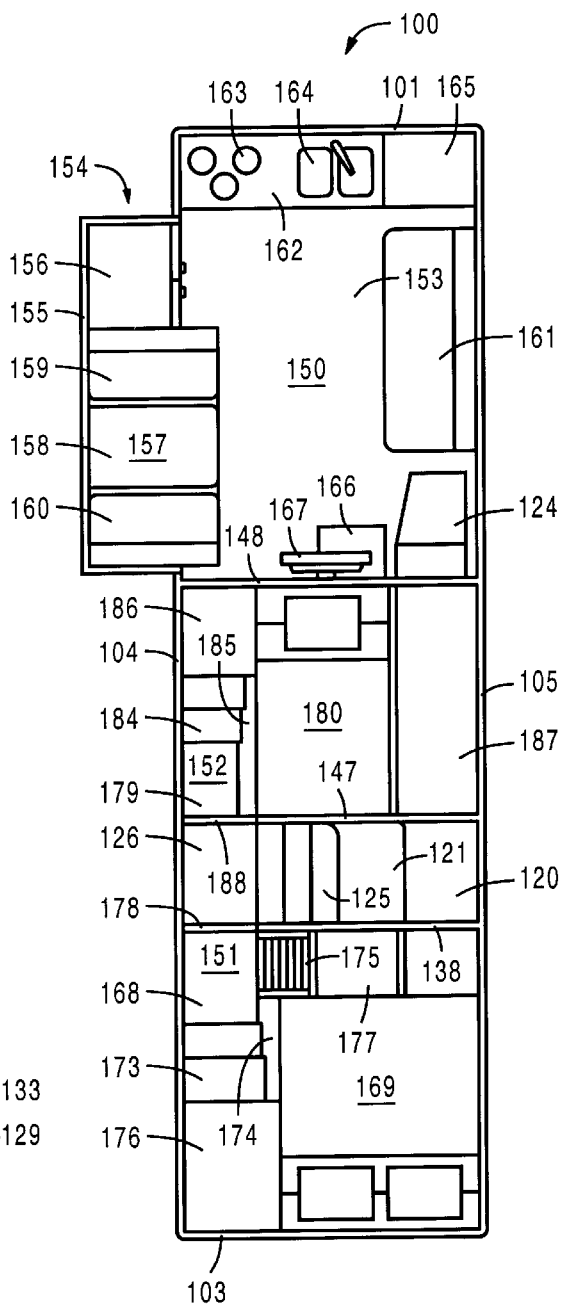
FIG. 7 shows a floor plan of the upper story of the preferred embodiment with the left slide extended.
Figure 8:
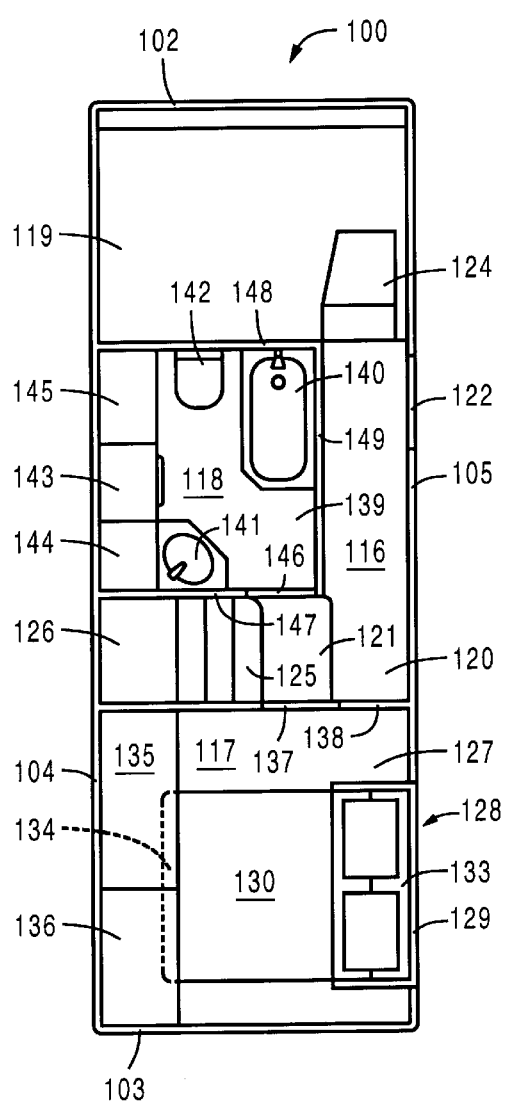
FIG. 8 shows a floor plan of the lower story of the preferred embodiment with the right slide retracted.
Figure 9:
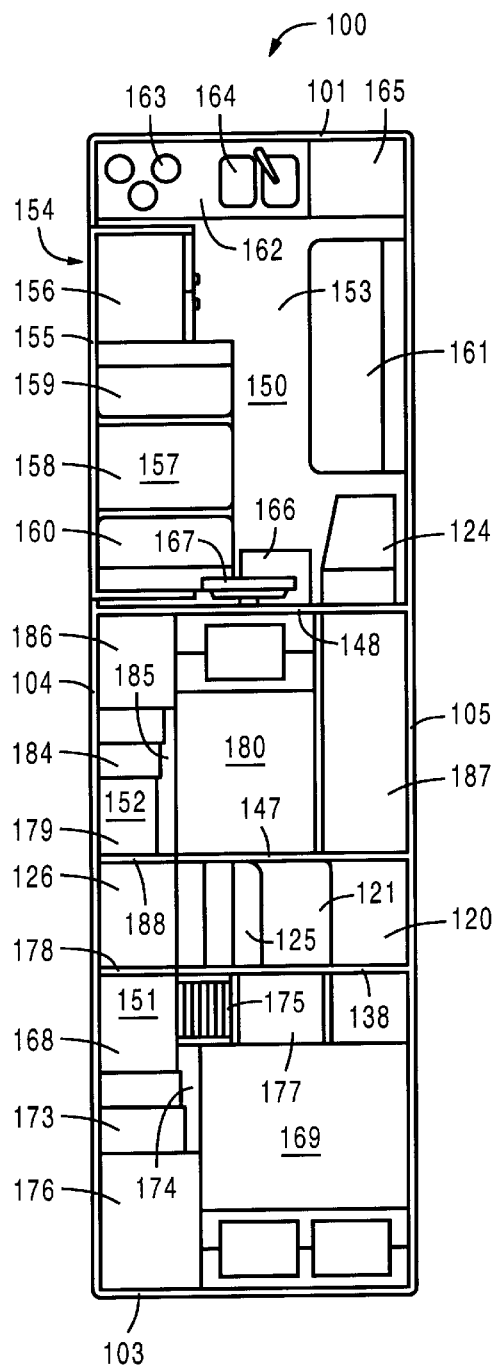
FIG. 9 shows a floor plan of the upper story of the preferred embodiment with the left slide retracted.
Figure 10:
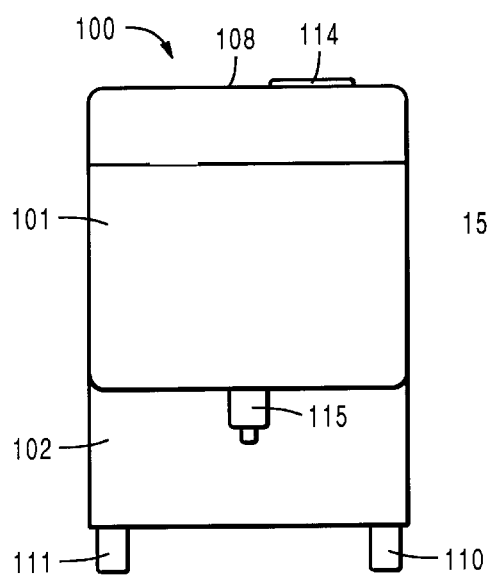
FIG. 10 is a front view of the preferred embodiment with the slides retracted.
Figure 12:
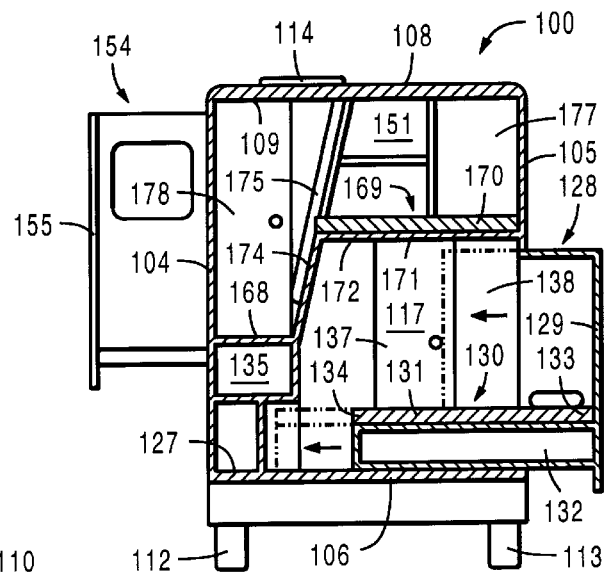
FIG. 12 is a sectional view of the preferred embodiment taken along line 12-12' in FIG. 3.
Figure 11:
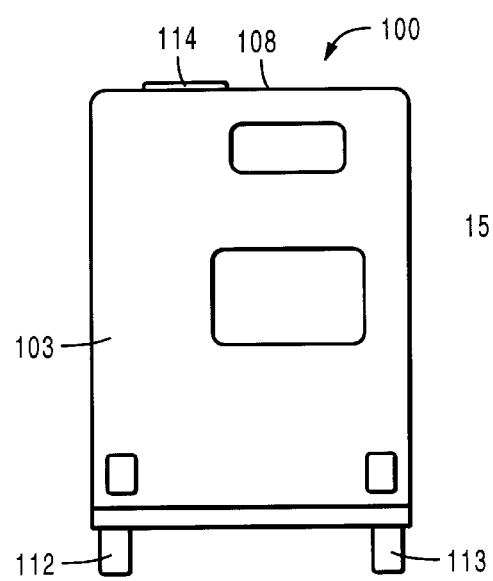
FIG. 11 is a rear view of the preferred embodiment with the slides retracted.
Figure 13:
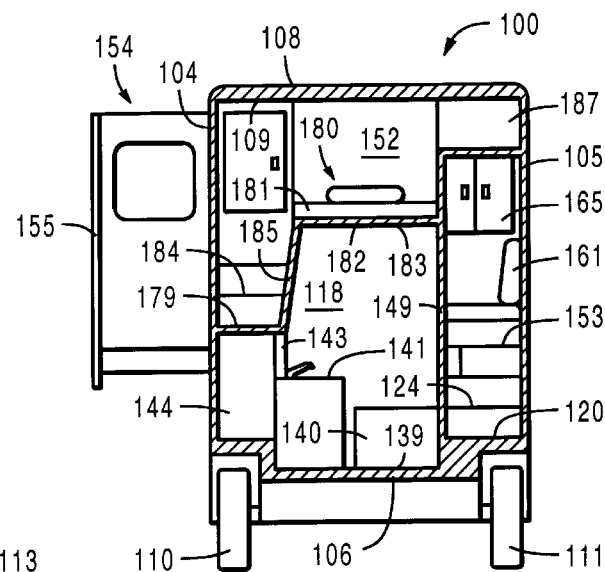
FIG. 13 is a sectional view of the preferred embodiment taken along line 13-13' in FIG. 3.
Figure 14:
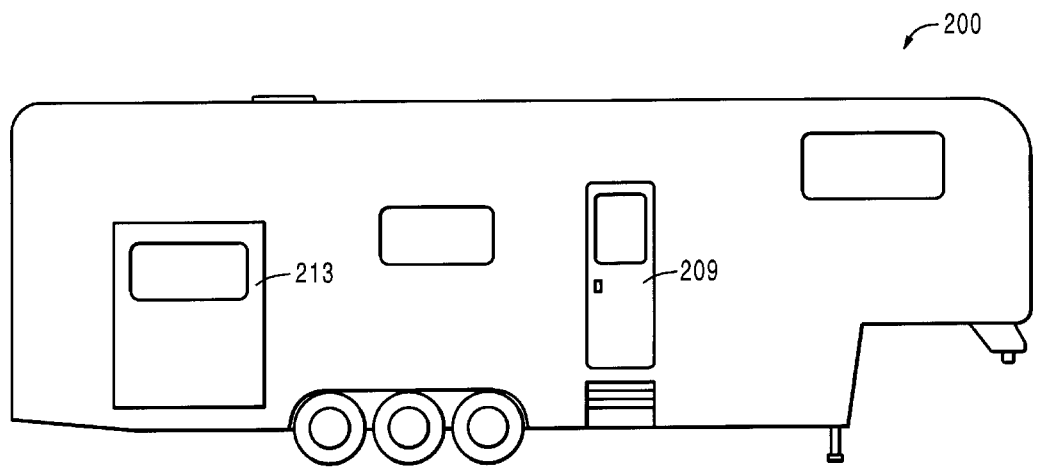
FIG. 14 is an external side view of the second embodiment which is a fifth-wheel trailer of approximately 11 m (36 feet) in length.
Figure 15:
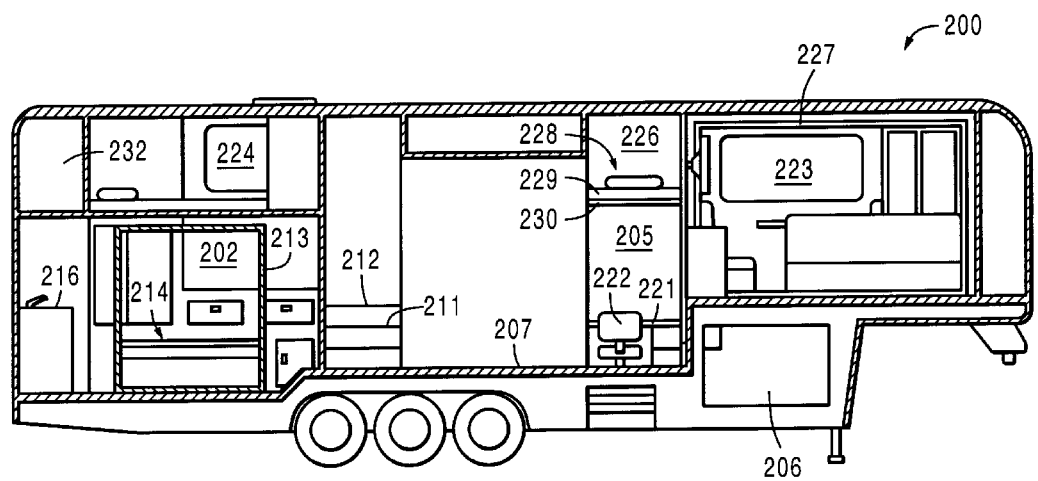
FIG. 15 is a sectional side view of the second embodiment.
Figures 16, 17:
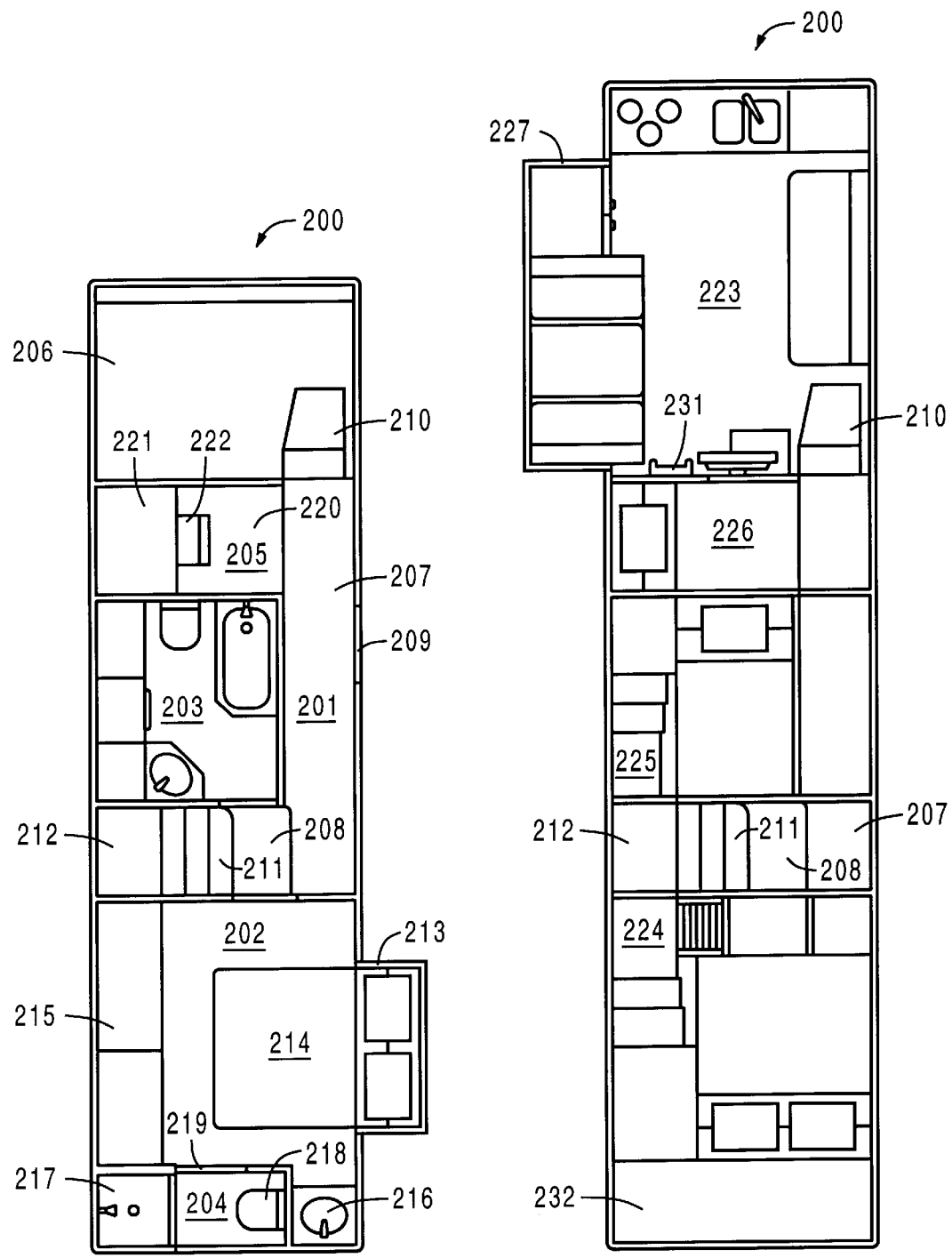
FIG. 16 shows a floor plan of the lower story of the second embodiment with the right slide extended.
FIG. 17 shows a floor plan of the upper story of the second embodiment with the left slide extended.
Figure 18:
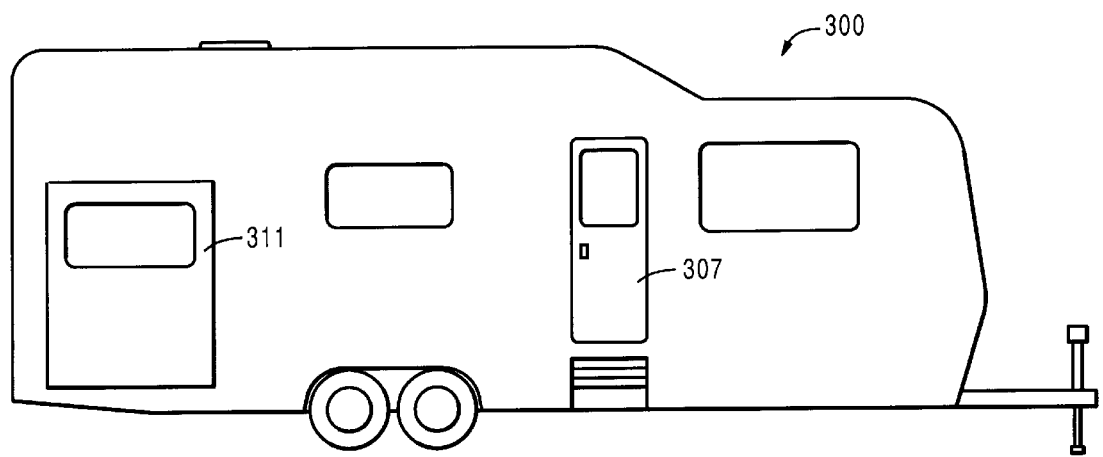
FIG. 18 is an external side view of the third embodiment which is a travel trailer with a body length of approximately 9.4 m (31 feet).
Figure 19:
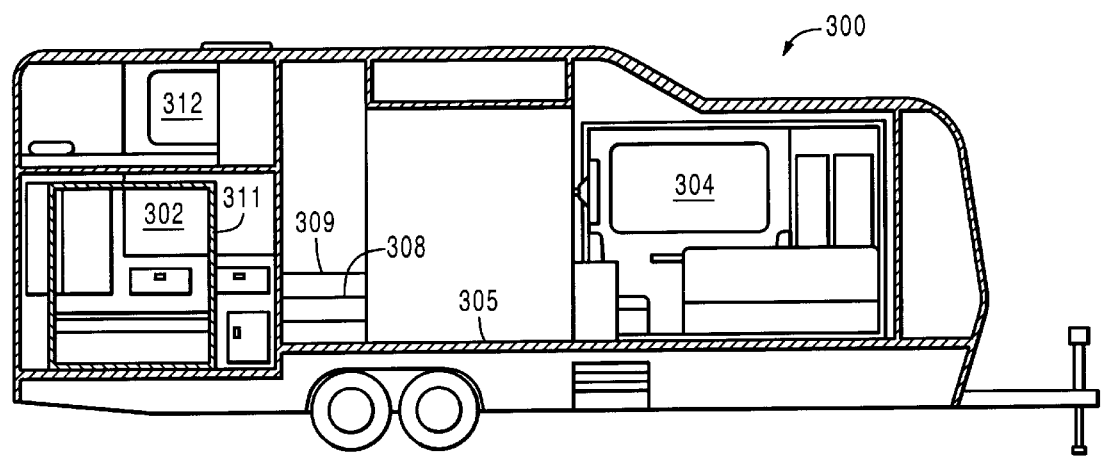
FIG. 19 is a sectional side view of the third embodiment.
Figure 20:
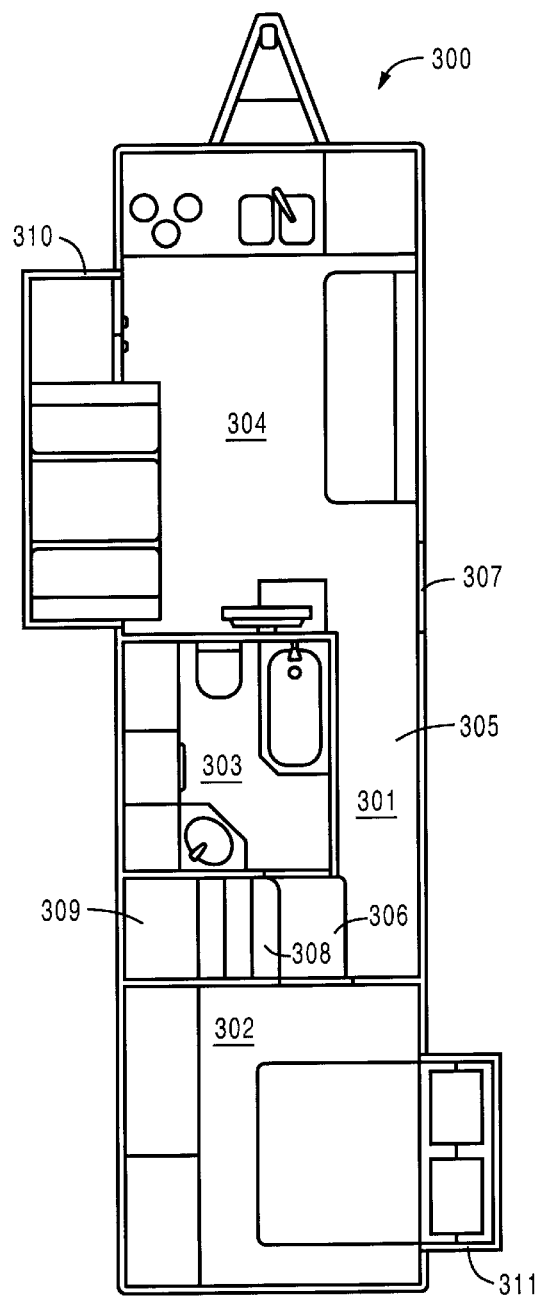
FIG. 20 shows a floor plan of the lower story of the third embodiment with the slides extended.
Figure 21:
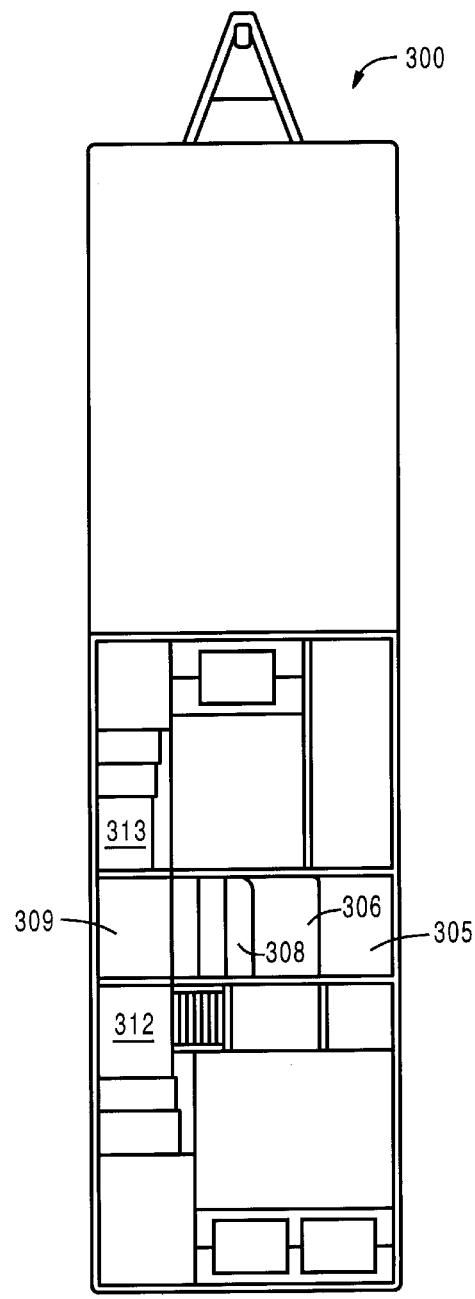
FIG. 21 shows a floor plan of the upper story of the third embodiment.
Figure 22:
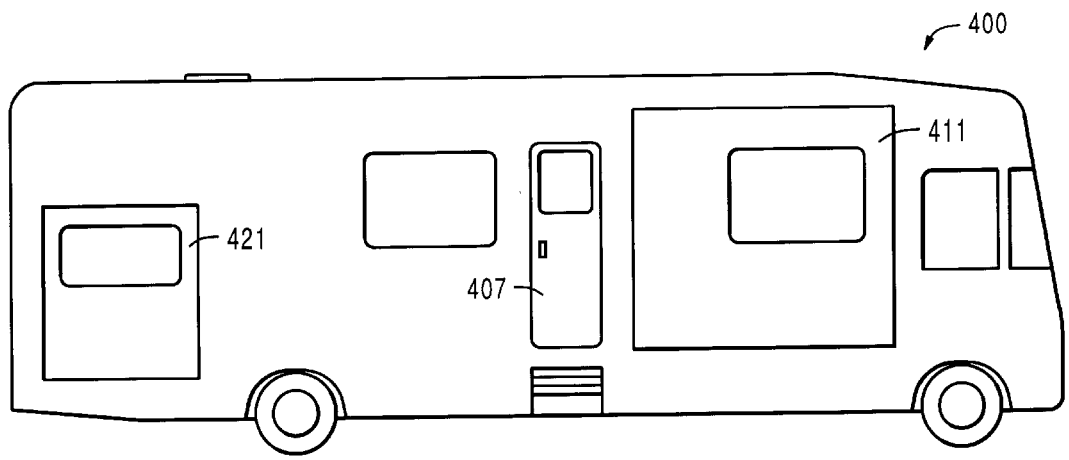
FIG. 22 is an external side view of the fourth embodiment which is a motor home of approximately 11 m (36 feet) in length.
Figure 23:
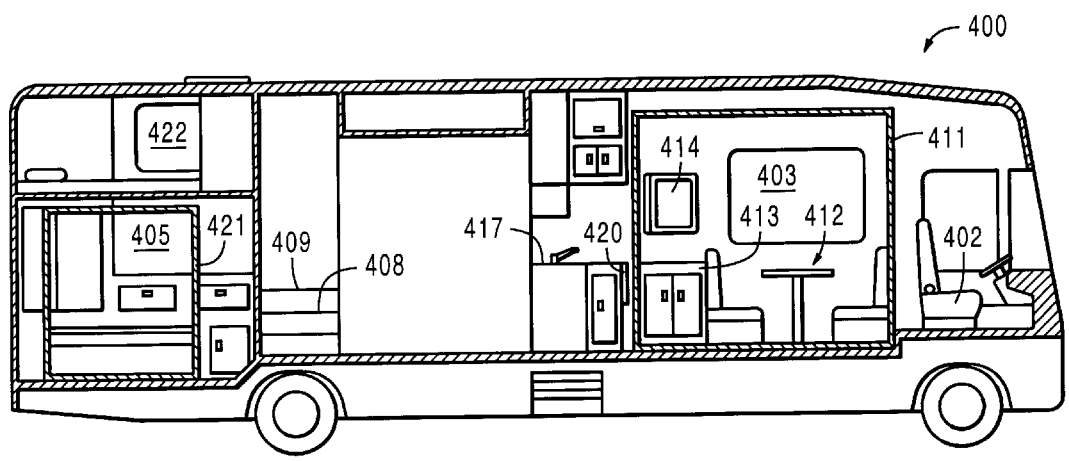
FIG. 23 is a sectional side view of the fourth embodiment.
Figure 24:
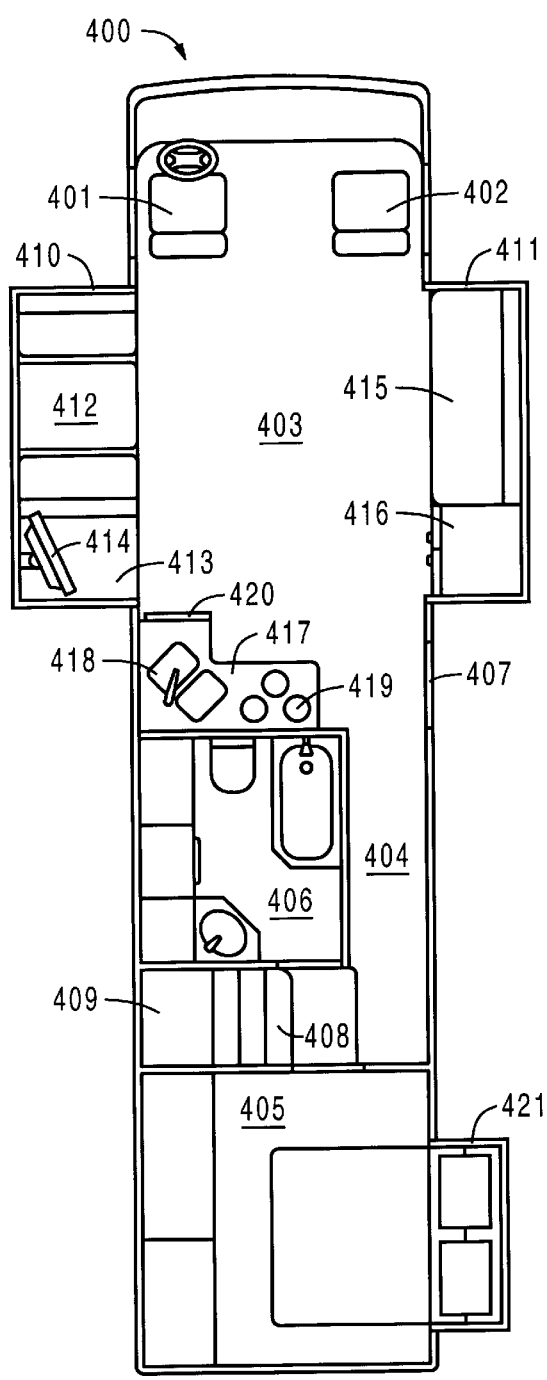
FIG. 24 shows a floor plan of the lower story of the fourth embodiment with the slides extended.
Figure 25:
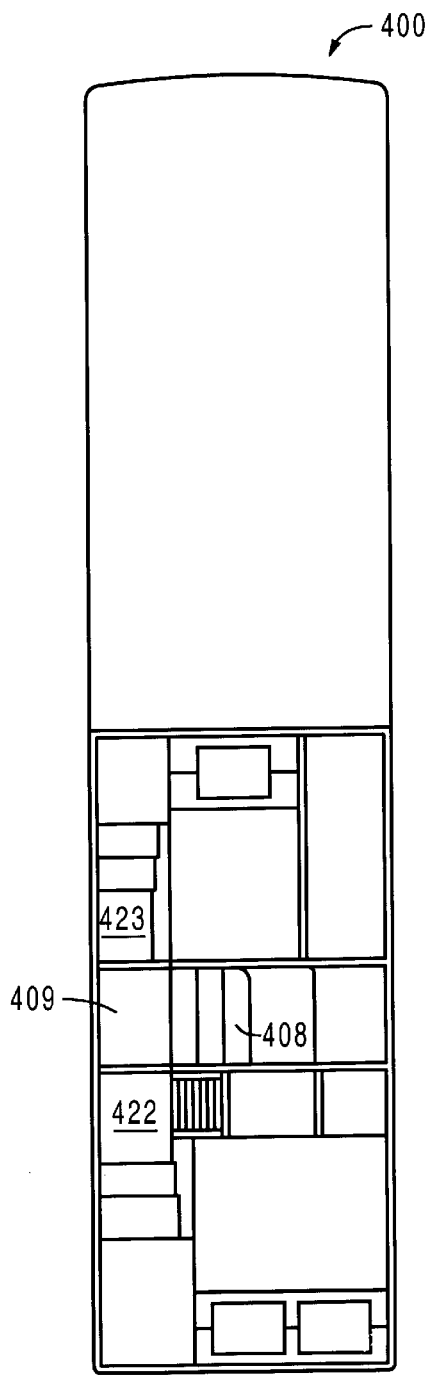
FIG. 25 shows a floor plan of the upper story of the fourth embodiment.

First bedroom 117 contains a queen-size bed 130 which includes a mattress 131 and a storage compartment 132. Bed 130 has a head end 133 which is connected to the interior of slide 128, and a foot end 134 which slides over bedroom floor 127 when slide 128 is moved between its extended position and its retracted position. Alternatively, a sofa bed or a Murphy bed may be used so that first bedroom 117 may also serve as a family room or an office. When slide 128 is extended, bed 130 becomes an island bed as shown in FIGS. 6 and 12 so that it can be accessed from either side. First bedroom 117 also contains a closet 135 which includes a wardrobe 136. Closet 135 may extend under landing 126 and staircase 125. First bedroom 117 is separated from passageway 116 by a door 137 and an interior wall 138. Either a hinged door or a sliding door may be used.

Bathroom 118 has a floor 139 which is also positioned at the same level as lower floor 121 of passageway 116 at approximately 0.8 m above the ground. Bathroom 118 includes a bathtub 140, a sink 141, a toilet 142, a combination washing machine and dryer 143, and two storage compartments 144 and 145. Bathroom 118 is separated from lower floor 121 of passageway 116 by a door 146 and an interior wall 147. Interior walls 148 and 149 separate bathroom 118 from storage compartment 119 and upper floor 120 of passageway 116 in the respective order.

One possible modification is to install a shower stall adjacent to left side wall 104 in place of storage compartment 145. In this case, bath tub 140 may be omitted to make room for a larger entry way or a small second bathroom which may be accessible through a door in interior wall 149.

The upper story of fifth-wheel trailer 100 includes a living area 150, a second bedroom 151 and a third bedroom 152. Living area 150 is positioned on upper deck 107 at the front end of the vehicle. Second bedroom 151 and third bedroom 152 are positioned above first bedroom 117 and bathroom 118 in the respective order.

Living area 150 has a floor 153 which is positioned above storage compartment 119 at approximately 1.8 m above the ground. Living area 150 is equipped with a slide 154 which includes an exterior wall 155. Slide 154 is shown in its extended position in FIGS. 1, 3, 7, 12 and 13 and shown in its retracted position in FIG. 9. Exterior wall 155 is flush with left side wall 104 when slide 154 is in its retracted position. Slide 154 may be extended outwards by approximately 0.8 m in the usual manner.

Slide 154 contains a refrigerator 156 and a dinette 157. Dinette 157 includes a dining table 158 and two benches 159 and 160. A sofa 161 is provided on the right side of living area 150. Dinette 157 and sofa 161 may be converted into beds in the usual manner. A kitchen counter 162, a stove 163, a double sink 164, and a storage compartment 165 are provided at the front end of living area 150. An entertainment center 166 and a television 167 are provided at the rear end of living area 150.

If more space is desired for living area 150, an additional slide containing sofa 161 may be installed on the right side of the vehicle. Alternatively, the total length of the vehicle may be increased so that living area 150 may be made longer.

Second bedroom 151 has a floor 168 which is positioned a step higher than landing 126 at approximately 1.1 m above first bedroom floor 127 and 1.9 m below lower surface 109 of roof 108. Second bedroom 151 is equipped with a queen-size bed 169 which includes a mattress 170 and a platform 171. Platform 171 has a lower surface 172 which serves as a ceiling for first bedroom 117. Platform 171 is positioned at approximately 1.9 m above first bedroom floor 127 and approximately 0.8 m above second bedroom floor 168. The combined thickness of mattress 170 and platform 171 is approximately 0.2 m so that the vertical distance between mattress 170 and lower surface 109 of roof 108 is approximately 0.9 m.

Bed 169 may be accessed by means of steps 173. Alternatively a small ladder may be used. An inclined partition 174 is positioned between second bedroom floor 168 and platform 171. Although a vertical partition may be used, an inclined partition can provide significantly more space at the waist level in second bedroom 151 without taking away a lot of usable space in first bedroom 117. When slide 128 is in its retracted position, foot end 134 of bed 130 in first bedroom 117 is positioned under wardrobe 136, second bedroom floor 168 and inclined partition 174 as shown by hidden lines in FIG. 8 and shown by phantom lines in FIG. 12. A ladder 175 is provided in second bedroom 151 for accessing roof 108 through hatch 114. Two storage compartments 176 and 177 are also provided for second bedroom 151. A door 178 and the top part of interior wall 138 separate second bedroom 151 from landing 126, staircase 125 and passageway 116.

The arrangement of first bedroom floor 127, second bedroom floor 168 and platform 171 makes it possible for an average adult to stand upright inside first bedroom 117 and second bedroom 151. This arrangement also provides enough room for an average adult to sit on bed 169.

Similarly third bedroom 152 has a floor 179 which is positioned a step higher than landing 126 at approximately 1.2 m above bathroom floor 139 and 1.8 m below lower surface 109 of roof 108. Bedroom 152 is equipped with a twin bed 180 which includes a mattress 181 and a platform 182. Platform 182 has a lower surface 183 which serves as a ceiling for bathroom 118. Platform 182 is positioned at approximately 2 m above bathroom floor 139 and approximately 0.8 m above third bedroom floor 179. The combined thickness of mattress 181 and platform 182 is approximately 0.2 m so that the vertical distance between mattress 181 and lower surface 109 of roof 108 is approximately 0.8 m.

Bed 180 may be accessed by means of steps 184. An inclined partition 185 is positioned between third bedroom floor 179 and platform 182. Although a vertical partition may be used, an inclined partition can provide significantly more space at the waist level in third bedroom 152 without taking away a lot of usable space in bathroom 118. Two storage compartments 186 and 187 are also provided for third bedroom 152. A door 188 and the top part of interior wall 147 separate third bedroom 152 from landing 126, staircase 125 and passageway 116 while the top part of interior wall 148 separates third bedroom 152 from living area 150.

If a shower stall is installed in bathroom 118 in place of storage compartment 145 as mentioned earlier, storage compartment 186 may be made smaller and the ceiling above the shower stall may protrude above the level of platform 182 to provide more headroom for people to take a shower.

The arrangement of upper floor 120 of passageway 116, bathroom floor 139, third bedroom floor 179, platform 182 and storage compartment 187 makes it possible for an average adult to stand upright above upper floor 120 of passageway 116 as well as inside bathroom 118 and third bedroom 152. This arrangement also provides enough room for an average adult to crawl on bed 180.

DESCRIPTION OF THE SECOND EMBODIMENT

FIGS. 14–17 show the second embodiment of the present invention which is a fifth-wheel trailer 200 of approximately 11 m (36 feet) in length.

The lower story of fifth-wheel trailer 200 includes a passageway 201, a first bedroom 202, a first bathroom 203, a second bathroom 204, an office 205 and a storage compartment 206. Passageway 201 includes an upper floor 207 and a lower floor 208. First bathroom 203 is similar to bathroom 118 of the preferred embodiment. An entry door 209 is provided on the right side of the vehicle. Two staircases 210 and 211 are provided at the front and rear ends of passageway 201 in the respective order. Staircase 211 leads to a landing 212 on the left side of the vehicle.

First bedroom 202 is equipped with a slide 213, a bed 214 and a closet 215 which are similar to slide 128, bed 130 and closet 135 of the preferred embodiment 100. A sink 216 is also provided in first bedroom 202.

Second bathroom 204 contains a shower stall 217 and a toilet 218. Second bathroom 204 is separated from first bedroom 202 by a sliding door 219. A rear entry door may also be provided so that second bathroom 204 may be directly accessed from the outside of the vehicle.

Office 205 has a floor 220 which is positioned a step lower than upper floor 207 of passageway 201. A desk 221 and a chair 222 are provided in office 205.

The upper story of fifth-wheel trailer 200 includes a living area 223, a second bedroom 224, a third bedroom 225 and a fourth sleeping compartment 226. Sleeping compartment 226 is not considered as a bedroom because it is not substantially enclosed and does not include a standing area. Living area 223 and third bedroom 225 are similar to living area 150 and third bedroom 152 of the preferred embodiment 100 in the respective order. Living area 223 is equipped with a slide 227 on the left side of the vehicle. Sleeping compartment 226 is equipped with a loft bed 228 which includes a mattress 229 and a platform 230. It may be accessed by means of a removable ladder 231 when slide 227 is in its extended position. Second bedroom 224 is similar to second bedroom 151 of the preferred embodiment 100 with the addition of a large storage compartment 232 at the rear end of the vehicle. Alternatively, a pet balcony may be provided in place of storage compartment 232.

Another possible modification is to put the galley on the lower story in place of office 205 to create more open space in living area 223.

DESCRIPTION OF THE THIRD EMBODIMENT

FIGS. 18–21 show the third embodiment which is a travel trailer 300 with a body length of approximately 9.4 m (31 feet).

The lower story of travel trailer 300 includes a passageway 301, a first bedroom 302, a bathroom 303 and a living area 304. Passageway 301 includes an upper floor 305 and a lower floor 306. Upper floor 305 is positioned at approximately 1 m above the ground whereas lower floor 306 is positioned at approximately 0.8 m above the ground. An entry door 307 is provided on the right side of the vehicle. A staircase 308, which is connected to lower floor 306 of passageway 301, leads to a landing 309 on the left side of the vehicle. Living area 304 is equipped with a slide 310 on the left side whereas first bedroom 302 is equipped with a slide 311 on the right side.

The upper story of travel trailer 300 includes a second bedroom 312 and a third bedroom 313.

The floor plan of travel trailer 300 is similar to that of the preferred embodiment 100. The main difference is that living area 304 is positioned on the lower story at the same level as upper floor 305 of passageway 301.

First bedroom 302, bathroom 303, second bedroom 312 and third bedroom 313 are similar to first bedroom 117, bathroom 118, second bedroom 151 and third bedroom 152 of the preferred embodiment 100 in the respective order.

DESCRIPTION OF THE FOURTH EMBODIMENT

FIGS. 22–25 show the fourth embodiment which is a 3-bedroom motor home 400 of approximately 11 m (36 feet) in length.

The lower story of motor home 400 includes a driver's seat 401, a passenger's seat 402, a living area 403, a passageway 404, a first bedroom 405 and a bathroom 406. An entry door 407 is provided on the right side of the vehicle. A staircase 408 at the rear end of passageway 404 leads to a landing 409 on the left side of the vehicle. Living area 403 is equipped with two slides 410 and 411. Slide 410 contains a dinette 412, a storage compartment 413 and a television 414. Slide 411 contains a sofa 415 and a refrigerator 416. A kitchen counter 417, a double sink 418, a stove 419 and a drop leaf 420 are provided at the rear end of living area 403.

First bedroom 405 and bathroom 406 are similar to first bedroom 117 and bathroom 118 of the preferred embodiment 100 in the respective order. First bedroom 405 is equipped with a slide 421 on the right side of the vehicle.

The upper story of motor home 400 includes a second bedroom 422 and a third bedroom 423 which are similar to second bedroom 151 and third bedroom 152 of the preferred embodiment 100 in the respective order.

The engine (not shown) may be positioned at the front end of the vehicle in the usual manner.

CONCLUSION, RAMIFICATIONS AND SCOPE

Accordingly, the reader will see that the recreational vehicle of the present invention provides multiple sleeping compartments, including 3 walk-in bedrooms, a spacious living area, and one or two bathrooms in a relatively compact body which makes it as easy to tow, drive or park as many conventional one-bedroom recreational vehicles.

The reader will also see that the present invention provides an arrangement of bedrooms, living area and bathroom which allows an occupant to walk from any bedroom to the living area or the bathroom without going through another bedroom.

Although the description above contains many specificities, these should not be construed as limiting the scope of the invention but as merely providing illustrations of some of the presently preferred embodiments of the present invention. For example, a fifth-wheel trailer may be built based on the floor plan of fifth-wheel trailer 200 without second bathroom 204 and storage compartment 232, or without office 205 and loft bed 228; a travel trailer may be built based on the floor plan of fifth-wheel trailer 200 with the living area positioned on the lower story; the front and rear ends of travel trailer 300 may be reversed so that first bedroom 302 and second bedroom 312 are positioned at the front end and living area 304 is positioned at the rear end; motor home 400 may be made longer with the addition of a second bathroom at the rear end of the vehicle, etc.

Thus the scope of the invention should be determined by the appended claims and their legal equivalents, rather than by the examples given.

What is claimed is:

1. A fifth-wheel trailer comprising:
   an elongated body including a main deck, an upper deck, two opposite side walls, namely a first side wall and a second side wall, and a roof, wherein said recreational vehicle is defined by three contiguous sections, namely a front section, a middle section and a rear section, and wherein said front section includes an overhanging front end containing a portion of said upper deck;
   a living area positioned in said front section on said upper deck;
   a first sleeping compartment positioned in said rear section on said main deck and comprising a first lowered floor and a first bed;
   a second sleeping compartment positioned in said rear section above said first sleeping compartment and comprising a first elevated platform, wherein the ceiling of said first sleeping compartment comprises a lower surface of said first elevated platform and wherein said first elevated platform is positioned at a sufficient height to allow an average adult to stand on said first lowered floor, and a first elevated floor positioned adjacent to said first side wall at a level substantially higher than said first lowered floor and substantially lower than said first elevated platform, wherein said first elevated floor staggers with said first elevated platform and provides access to a sleeping area above said first elevated platform;
   a bathroom positioned in said middle section on said main deck and comprising a second lowered floor;
   a passageway positioned in said middle section on said main deck and communicating with said living area, said first sleeping compartment, and said bathroom;
   a third sleeping compartment positioned in said middle section above said bathroom and comprising a second elevated platform, wherein the ceiling of said bathroom comprises a lower surface of said second elevated platform and wherein said second elevated platform is positioned at a sufficient height to allow an average adult to stand on said second lowered floor, and a second elevated floor positioned adjacent to said first side wall at a level substantially higher than said second lowered floor and substantially lower than said second elevated platform, wherein said second elevated floor staggers with said second elevated platform and provides access to a sleeping area above said second elevated platform; and
   an access member communicating said passageway with said first elevated floor and said second elevated floor.

2. The fifth-wheel trailer of claim 1, further comprising a storage compartment positioned in said front section beneath said upper deck.

3. The fifth-wheel trailer of claim 1, further comprising a first interior wall separating said first sleeping compartment and said second sleeping compartment from said passageway, and a second interior wall separating said bathroom and said third sleeping compartment from said living area.

4. The fifth-wheel trailer of claim 1, wherein said first elevated floor is positioned at a height between 0.6 m and 1.6 m above said first lowered floor, and wherein said second elevated floor is positioned at a height between 0.6 m and 1.6 m above said second lowered floor.

5. The fifth-wheel trailer of claim 1, further comprising an inclined partition joining said first elevated floor and said first elevated platform.

6. The fifth-wheel trailer of claim 1, further comprising an inclined partition joining said second elevated floor and said second elevated platform.

7. The fifth-wheel trailer of claim 1, wherein said access member is positioned adjacent to said first side wall and comprises a staircase.

8. The fifth-wheel trailer of claim 7, wherein said main deck comprises a lower section and an upper section, and wherein said upper section is positioned above a wheel.

9. The fifth-wheel trailer of claim 8, wherein said first sleeping compartment and said bathroom are positioned on said lower section of said main deck.

10. The fifth-wheel trailer of claim 9, wherein said passageway comprises a first floor section positioned on said upper section of said main deck adjacent to said second side wall.

11. The fifth-wheel trailer of claim 10, wherein said second elevated platform staggers with said first floor section thereby allowing an average adult to walk on said first floor section.

12. The fifth-wheel trailer of claim 11, further comprising a storage compartment positioned adjacent to said second side wall above said first floor section at a level substantially higher than said second elevated platform, wherein the vertical distance between said storage compartment and said first floor section is sufficient to allow an average adult to walk on said first floor section beneath said storage compartment.

13. The fifth-wheel trailer of claim 11, wherein said passageway further comprises a second floor section positioned on said lower section of said main deck between said first sleeping compartment and said bathroom.

14. The fifth-wheel trailer of claim 11, further comprising a retractable room extension for extending said first sleeping compartment in a direction outward from said second side wall.

15. The fifth-wheel trailer of claim 14, wherein said retractable room extension contains a first end of said first bed.

16. The fifth-wheel trailer of claim 15, wherein said first end of said first bed protrudes outwards beyond said second side wall when said retractable room extension is in an extended position thereby allowing a person to walk on said first lowered floor between said first bed and said first elevated floor.

17. The fifth-wheel trailer of claim 16, wherein said retractable room extension comprises a slide.

18. The fifth-wheel trailer of claim 17, wherein said first bed comprises a second end which is positioned beneath said first elevated floor when said retractable room extension is in a retracted position.

19. The fifth-wheel trailer of claim 17, further comprising an inclined partition joining said first elevated floor and said first elevated platform, wherein said first bed comprises a second end which is positioned beneath said inclined partition when said retractable room extension is in a retracted position.

20. A fifth-wheel trailer comprising:

an elongated body including a main deck, an upper deck, two opposite side walls, namely a first side wall and a second side wall, adn a roff, wherein said fifth-wheel trailer is defined by three contiguous sections, namely a front section, a middle section and a rear section, and wherein said front section includes an overhanging front end containing a portion of said upper deck;

a living area positioned in said front section on said upper deck;

a first bedroom positioned in said rear section on said main deck and comprising a first bedroom floor and a first bed;

a second bedroom positioned in said rear section above said first bedroom and comprising a first elevated platform, wherein the ceiling of said first bedroom comprises a lower surface of said first elevated platform and wherein said first elevated platform is positioned at a sufficient height to allow an average adult to stand on said first bedroom floor, and a second bedroom floor positioned adjacent to said first side wall at a level substantailly higher than said first bedroom floor and substantailly lower than said first elevated platform, wherein said second bedroom floor staggers with said first elevated platform and provides access to a sleeping area above said first elevated platform;

a bathroom positioned in said middle section on said main deck and comprising a bathroom floor;

a passageway positioned in said middle section on said middle deck and communicating with said living area, said first bedroom, and said bathroom;

a third bedroom positioned in said middle section above said bathroom and comprising a second elevated platform, wherein the ceiling of said bathroom comprises a lower surface of said second elevated platform and wherein said second elevated platform is positioned at a sufficient height to allow an average adult to stand on said bathroom floor, and a third bedroom floor positioned adjacent to said first side wall at a level substantially higher than said bathroom floor and substantially lower than said second elevated platform, wherein said third bedroom floor staggers with said second elevated platform and provides to a sleeping area above said second elevated platform; and an access member communicating said passageway with said second bedroom floor and said third bedroom floor.

* * * * *